US009574960B2

(12) United States Patent
Ned et al.

(10) Patent No.: US 9,574,960 B2
(45) Date of Patent: Feb. 21, 2017

(54) ULTRA-MINIATURE MULTI-HOLE FLOW ANGLE PROBES

(71) Applicant: Kulite Semiconductor Products, Inc., Leonia, NJ (US)

(72) Inventors: Alexander A. Ned, Kinnelon, NJ (US); Tonghuo Shang, Denville, NJ (US); Scott Goodman, Wayne, NJ (US); Steve Carter, League City, TX (US); Joseph R. VanDeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 272 days.

(21) Appl. No.: 14/327,411

(22) Filed: Jul. 9, 2014

(65) Prior Publication Data

US 2016/0011065 A1    Jan. 14, 2016

(51) Int. Cl.
| | |
|---|---|
| *G01F 1/46* | (2006.01) |
| *G01P 5/16* | (2006.01) |
| *G01P 5/165* | (2006.01) |
| *G01L 19/00* | (2006.01) |
| *G01P 13/02* | (2006.01) |

(52) U.S. Cl.
CPC ............. *G01L 19/0038* (2013.01); *G01F 1/46* (2013.01); *G01P 5/16* (2013.01); *G01P 5/165* (2013.01); *G01P 13/025* (2013.01)

(58) Field of Classification Search
CPC ............... G01P 5/00; G01P 5/16; G01P 5/165; G01P 13/025; G01L 9/0054; G01L 9/06; G01L 19/0038; G01F 1/46
USPC ................................................... 73/754, 721
See application file for complete search history.

(56) References Cited

U.S. PATENT DOCUMENTS

| | | | | |
|---|---|---|---|---|
| 3,149,491 | A * | 9/1964 | Sissenwine | G01P 5/00 73/178 R |
| 4,442,720 | A * | 4/1984 | Apley | G01N 1/2035 73/863.31 |
| 4,559,836 | A * | 12/1985 | Coleman | G01F 1/46 73/861.66 |
| 4,677,858 | A * | 7/1987 | Ohnhaus | G01P 5/165 73/861.65 |
| 5,406,839 | A * | 4/1995 | Leblond | G01P 13/025 73/170.02 |
| 5,423,209 | A * | 6/1995 | Nakaya | G01F 1/46 73/182 |

(Continued)

*Primary Examiner* — Peter Macchiarolo
*Assistant Examiner* — Monica S Young
(74) *Attorney, Agent, or Firm* — Troutman Sanders LLP; James E. Schutz; Mark Lehi Jones

(57) ABSTRACT

This disclosure provides example methods, devices, and systems for an ultra-miniature, multi-hole flow angle probe. The construction, packaging of a multitude of absolute and or differential pressure transducers or sensors are invented for the purpose of providing highly accurate measurement of flow properties, flow angle in particular. The unique placement of sensors leads to further miniaturization relative to current state of the art. Further the use of closely coupled, differential transducer or transducers achieves higher accuracy measurement of small pressure variations coupled with large mean or average baseline pressures, as is demanded in modern aerodynamic or turbo-machinery devices. The use and installation of ultra-miniature sensors insider the device invented herein achieves higher frequency response than allowable via previous state of the part.

21 Claims, 11 Drawing Sheets

(56) References Cited

U.S. PATENT DOCUMENTS

| | | | | |
|---|---|---|---|---|
| 5,438,880 | A | * | 8/1995 | Washburn ............... G01P 5/16 73/718 |
| 7,219,558 | B1 | * | 5/2007 | Bowman ................. G01F 1/40 73/861.52 |
| 7,392,710 | B1 | * | 7/2008 | Ben-Mansour ...... G01D 11/245 73/727 |
| 2002/0121135 | A1 | * | 9/2002 | Rediniotis ............ G01P 13/025 73/170.11 |
| 2003/0140704 | A1 | * | 7/2003 | Kurtz ..................... G01F 1/46 73/727 |
| 2005/0011285 | A1 | * | 1/2005 | Giterman ............... G01P 5/165 73/861.65 |
| 2007/0022807 | A1 | * | 2/2007 | Miller .................. G01C 21/005 73/170.02 |
| 2010/0107774 | A1 | * | 5/2010 | Kurtz .................... G01L 15/00 73/754 |
| 2015/0377662 | A1 | * | 12/2015 | Ray ....................... G01F 1/383 73/861.47 |

* cited by examiner

900

901 — PROVIDING A HOUSING HAVING A FRONT PORTION WITH A FIRST OBLIQUE SIDE AND A SECOND OBLIQUE SIDE, WHEREIN THE HOUSING INCLUDES A FIRST APERTURE DISPOSED ON THE FIRST OBLIQUE SIDE AND A SECOND APERTURE DISPOSED ON THE SECOND OBLIQUE SIDE

903 — INSERTING A FIRST TRANSDUCER STRUCTURE INTO THE HOUSING PROXIMATE THE FIRST APERTURE, WHEREIN THE FIRST TRANSDUCER STRUCTURE IS CONFIGURED TO INCLUDE A FIRST TRANSDUCER FOR MEASURING A FIRST ENVIRONMENTAL CONDITION RECEIVED AT THE FIRST APERTURE

905 — INSERTING A SECOND TRANSDUCER STRUCTURE INTO THE HOUSING PROXIMATE THE SECOND APERTURE, WHEREIN THE SECOND TRANSDUCER STRUCTURE IS CONFIGURED TO INCLUDE A SECOND TRANSDUCER FOR MEASURING A SECOND ENVIRONMENTAL CONDITION RECEIVED AT THE SECOND APERTURE;

907 — COUPLING THE FIRST TRANSDUCER STRUCTURE TO THE FIRST APERTURE

909 — COUPLING THE SECOND TRANSDUCER STRUCTURE TO THE SECOND APERTURE, WHEREIN AT LEAST ONE OF THE FIRST TRANSDUCER AND THE SECOND TRANSDUCER IS CONFIGURED AS A DIFFERENTIAL TRANSDUCER AND A WIDTH OF THE HOUSING IS LESS THAN FIVE-TENTHS OF AN INCH

FIG. 9

ULTRA-MINIATURE MULTI-HOLE FLOW ANGLE PROBES

TECHNICAL FIELD

This invention relates to multi-hole pressure probes and more particularly to ultra-miniature, multi-hole flow angle probes.

BACKGROUND

The use of multi-hole pressure probes is a longstanding approach for measuring flow angles, stagnation and static pressures. Orthogonal flow angles as well as stagnation and static pressure may all be deduced from pressures measured at, for instance, several well chosen locations on the probe. Since the Mach number is a unique function of the ratio of stagnation to static pressure, the Mach number may also be derived from the pressures measured by a multi-hole pressure probe. A larger number of measurement locations on a multi-hole pressure probe may generally improve measurement accuracy but in exchange for an increased probe size. Probe size may be important for reducing disturbances in the flow field. However, a reduction in probe size typically leads to reducing the number of measurements, which may result in fewer flow variables. Furthermore, to enable fabrication of small probes, the static pressure ports on these steady state probes are usually connected to remote pressure transducers over long lengths of small diameter tubing, which may restrict their time response to several seconds or longer. The need to obtain higher frequency measurements leads to the development of high frequency probes. The high frequency response of these probes may be set by three factors: a frequency response of the transducer, which is generally higher than other factors and may not be limiting; a resonant frequency of any cavity between the surface of the probe and a diaphragm of a transducer; and a vortex shedding frequency of the body of the probe, which may scale with the size of the probe and fluid velocity. The latter two factors may scale with the size of the probe, resulting in smaller probes yielding a higher usable frequency response. Using silicon-on-insulator (SOI) sensor fabrication techniques as described in U.S. Pat. No. 5,286,671, "FUSION BONDING TECHNIQUE FOR USE IN FABRICATING SEMICONDUCTOR DEVICES," provides small multi-hole probes with improved high frequency operation, as described in U.S. Pat. No. 8,069,732, entitled "ULTRA-MINIATURE MULTI-HOLE PROBES HAVING HIGH FREQUENCY, HIGH TEMPERATURE RESPONSES," and U.S. Pat. No. 7,484,418, entitled "ULTRA MINIATURE MULTI-HOLE PROBES HAVING HIGH FREQUENCY RESPONSE," all of which are assigned to Kulite Semiconductor Products, Inc. These tubular probes have a front probe surface that includes four or five apertures, wherein each aperture is associated with a separate high frequency transducer exposed to the pressure media. However, the use of absolute transducers in the probes to perform measurements of very small changes in pressure may introduce errors. Such errors may be associated with the use of separate high pressure absolute transducers for measuring very small changes in pressure riding on top of the stagnation pressure, which is a typical occurrence with low speed turbo-machinery. Accordingly, there is a need for improved techniques for ultra-miniature multi-hole flow angle probes. In addition, other desirable features and characteristics of the present disclosure will become apparent from the subsequent detailed description and claims, taken in conjunction with the accompanying figures and the foregoing technical field and background.

SUMMARY OF THE DISCLOSURE

Briefly described, embodiments of the present invention relate to ultra-miniature, multi-hole flow angle probes. According to one aspect, a probe may comprise a housing, a first aperture, a second aperture, a first transducer and a second transducer. The housing may be configured to have a front portion with a first oblique side and a second oblique side. The first aperture may be disposed on the first oblique side of the front portion of the housing. Further, the second aperture may be disposed on the second oblique side of the front portion of the housing. The first transducer may be disposed in the housing. Further, the first transducer may be proximate the first aperture. The first transducer may be configured to measure a first environmental condition received at the first aperture. Similarly, the second transducer may be disposed in the housing. Further, the second transducer may be proximate the second aperture. The second transducer may be configured to measure a second environmental condition received at the second aperture. In addition, at least one of the first transducer and the second transducer may be configured as a differential transducer and a width of the housing may be less than five-tenths of an inch.

According to another aspect, a probe by a process may include providing a housing having a front portion with a first oblique side and a second oblique side. Further, the housing may be configured to include a first aperture disposed on the first oblique side and a second aperture disposed on the second oblique side. The probe by the process may include inserting a first transducer into the housing proximate the first aperture. The first transducer may be configured for measuring a first environmental condition received at the first aperture. The probe by the process may include inserting a second transducer into the housing proximate the second aperture. The second transducer may be configured for measuring a second environmental condition received at the second aperture. The probe by the process may include coupling the first transducer to the first aperture. Similarly, the probe by the process may include coupling the second transducer to the second aperture. In addition, at least one of the first transducer and the second transducer may be configured as a differential transducer and a width of the housing may be less than five-tenths of an inch.

According to another aspect, a method may include receiving, from a first aperture disposed on a first oblique side of a front portion of a housing, by a first transducer disposed in the housing proximate the first aperture, a first environmental condition. The method may include measuring, by the first transducer, the first environmental condition to generate a first environmental condition signal. Also, the method may include outputting, by the first transducer, the first environmental condition signal. The method may include receiving, from a second aperture disposed on the second oblique side of the front portion of the housing, by a second transducer disposed in the housing proximate the second aperture, a second environmental condition. The method may include measuring, by the second transducer, the second environmental condition to generate a second environmental condition signal. The method may include outputting, by the second transducer, the second environmental condition signal. In addition, at least one of the first transducer and the second transducer may be configured as a differential transducer and a width of the housing may be less than five-tenths of an inch.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where:

FIG. 9 is a flowchart of one embodiment of a probe by a process in accordance with various aspects set forth herein.

DETAILED DESCRIPTION

Figure 1:
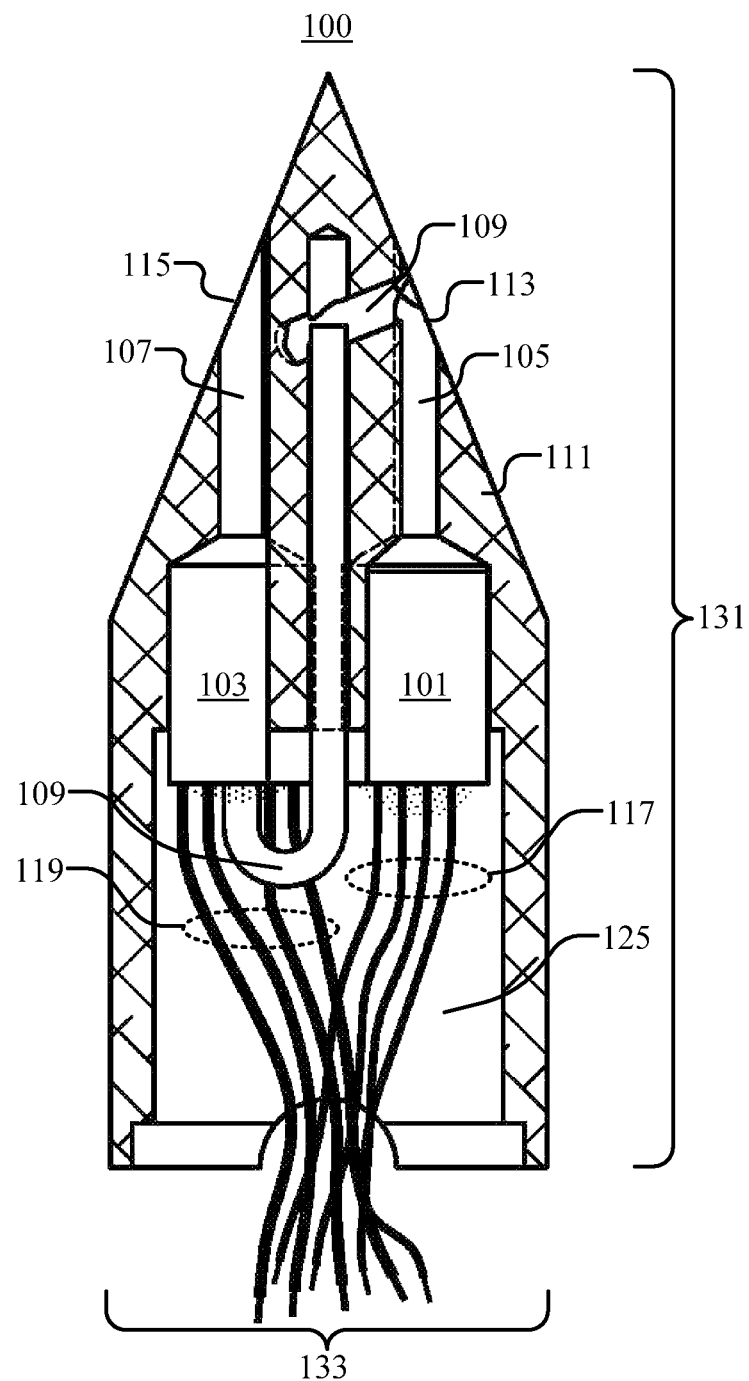
FIG. 1 illustrates a cross-sectional view of one embodiment of a probe in accordance with various aspects as described herein.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for ultra-miniature, multi-hole flow angle probes. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

This disclosure presents an ultra-miniature, multi-hole flow angle probe. For instance, by configuring a probe in accordance with various aspects described herein, an improved pressure measurement capability of a probe is provided. For example, FIG. 1 illustrates a cross-sectional view of one embodiment of a probe 100 in accordance with various aspects as described herein. In FIG. 1, the probe 100 may be configured to include a first transducer 101, a second transducer 103, a first tube 105, a second tube 107, a third tube 109, a housing 111, a first aperture 113 in the housing 111, a second aperture 115 in the housing 111, a first set of connectors 117, a second set of connectors 119, and a cavity 125. Dimensions of the probe 100 may include a height 131 and a width 133. The probe 100 may be configured to utilize one or more absolute transducers, one or more differential transducers or any combination thereof, which may be strategically disposed in the housing 111 such as near environmental conditions received at the first aperture 113 and the second aperture 115. The first transducer structure 101 may be configured to include a first transducer and a first header. The first transducer may be an absolute transducer or a differential transducer. In one example, the first transducer is an absolute transducer, which may be fabricated to include an internal reference environmental condition such as an internal hermetically-sealed vacuum reference pressure. The second transducer structure 103 may be configured to include a second transducer. The second transducer may be an absolute transducer or a differential transducer. In one example, the second transducer may be a differential transducer, which may be fabricated to include a reference tube or reference aperture. An integrated packaging of the first transducer structure 101 and the second transducer structure 103 in the housing 111 may provide a location of the first transducer and the second transducer proximate to the environmental conditions to be measured.

Furthermore, each of the first transducer and the second transducer may include SOI piezoresistive elements. In one example, each of the first transducer and the second transducer may be fabricated in accordance with techniques such as described by U.S. Pat. No. 5,286,671, entitled "FUSION BONDING TECHNIQUE FOR USE IN FABRICATING SEMICONDUCTOR DEVICES," U.S. Pat. No. 7,439,159, entitled "FUSION BONDING PROCESS AND STRUCTURE FOR FABRICATING SILICON-ON-INSULATOR (SOI) SEMICONDUCTOR DEVICES," U.S. Pat. No. 7,709,897, entitled "FUSION BONDING PROCESS AND STRUCTURE FOR FABRICATING SILICON-ON-INSULATOR (SOI) SEMICONDUCTOR DEVICES," U.S. Pat. No. 7,989,894, entitled "FUSION BONDING PROCESS AND STRUCTURE FOR FABRICATING SILICON-ON-INSULATION (SOI) SEMICONDUCTOR DEVICES," U.S. Pat. No. 5,955,771, entitled "SENSORS FOR USE IN HIGH VIBRATIONAL APPLICATIONS AND METHODS FOR FABRICATING SAME," and U.S. Pat. No. 5,973,590, entitled "ULTRA THIN SURFACE MOUNT WAFER SENSOR STRUCTURES AND METHODS FOR FABRICATING SAME," all of which are assigned to Kulite Semiconductor Products, Inc. A shape of a front portion of the probe 100 may be angled, conical, wedge-shaped, pointed, pyramidal, spherical, tapered or the like. Further, the shape of the front portion of the probe 100 may not impact dimensions of the probe 100. Depending on, for instance, a desired frequency response, a minimal probe size and shape may be obtained using the configuration of the probe 100. A person of ordinary skill in the art will recognize the utility of various shapes of the front portion of a probe for specific applications.

In FIG. 1, a first end of the first tube 105 may be coupled to the first aperture 113 of the housing 111, which may be used to receive a first environmental condition such as pressure. Further, the first transducer 101 may be coupled to a second end of the first tube 105. The housing 111 may be disposed around and define the first tube 105 and the first aperture 113. Furthermore, the second transducer 103 may be coupled to the second tube 107 and the third tube 109. A first end of the second tube 107 may be coupled to the second aperture 115. A first end of the third tube 109 may be coupled to the first aperture 111 or to another aperture in the housing 111. A second end of the second tube 107 may be coupled to a first side of the second transducer 103. A second end of the third tube 109, which may also be referred to as a reference tube, may be coupled to a reference side of the second transducer. The housing 111 may be disposed around and define the second tube 107, the third tube 109 or the second aperture 113. A length, a shape or the like of a tube may be selected to provide filtering of a fluid flow.

In FIG. 1, the first or main side of the second transducer 103 such as a differential pressure transducer may be positioned near the second aperture 115 of the housing 111. The second side of the second transducer 103, which may also be referred to as the reference side of the second transducer 103, may be coupled to the first aperture 113 using the third tube 109. The first tube 105 and the third tube 109 may share the first aperture 113 of the housing 111, which may allow for contemporaneous measurements of an environmental condition received at the first aperture 113 of the housing 111 by the first transducer 101 and the second 103. The first set of connectors 117 may be configured to couple the first transducer 101 to a first electronic circuit. Further, the first set of connectors 117 may allow the first transducer 101 to communicate with the first electronic circuit. In one example, the first transducer of 101 may provide a first environmental condition signal associated with a measured first environmental condition to the first electronic circuit using the first set of connectors 117. In another example, the first electronic circuit may configure the first transducer 101 using the first set of connectors 117. Also, the first electronic circuit may provide power to the first transducer 101 using the first set of connectors 117. The first set of connectors 117 may be disposed in the cavity 125 defined by the housing 111.

Similarly, the second set of connectors 119 may be configured to couple the second transducer 103 to a second electronic circuit. Further, the second set of connectors 119 may allow the second transducer 103 to communicate with the second electronic circuit. In one example, the second transducer 103 may provide a second environmental condition signal associated with a measured second environmental condition to the second electronic circuit using the second set of connectors 119. In another example, the second electronic circuit may configure the second transducer 101 using the second set of connectors 119. Also, the second electronic circuit may provide power to the second transducer 103 using the second set of connectors 119. Also, the second set of connectors 119 may provide power to the second transducer 103. The second set of connectors 119 may be disposed in the cavity 125 defined by the housing 111. Each of the first electronic circuit and the second electronic circuit may be placed in the housing 111 or may be located outside the housing 111. Further, the first electronic circuit and the second electronic circuit may be the same electronic circuit. A person of ordinary skill in the art will recognize various techniques for designing circuits to interface with a transducer.

The configuration of the probe 100 may allow for the height 131 or the width 133 of the housing 111 to be miniaturized. For example, the height 131 of the housing 111 may be about five-tenths of an inch (0.5 inches) nominally and can carry from 0.2 inches to 1 inch depending on the installation. In another example, the width 133 of the housing 111 may be about two-tenths of an inch (0.2 inches) and vary larger or smaller depending on the installation.

Furthermore, the housing 111 may also be used to attach or secure the probe 100 to another structure, protect all or a portion of the probe 100, provide a means to handle or place the probe 100 or the like. In one example, the housing 111 may be used to form an O-ring seal, may be threaded, may include a series of O-rings or bolts, or the like so that the probe 100 may be attached to another structure. The housing 111 may be composed of a thermally isolative or conductive material such as a ceramic material, metal or the like.

In this embodiment, in operation, the first transducer of the first transducer structure 101, which may be an absolute transducer, may receive, at the first transducer, from the first aperture 113 using the first tube 105, the first environmental condition. The first transducer 101 may measure the first environmental condition to generate a first environmental condition signal. The first transducer 101 may output the environmental condition signal using the first set of connectors 117. The second transducer 103, which may be a differential transducer, may receive from the second aperture 115 using the second tube 107, the second environmental condition. In one example, the first environmental condition may be equivalent to the second environmental condition. In another example, the first environmental condition may be different from the second environmental condition. Further, the second transducer 103 may receive from the first aperture 113 using the third tube 109, the first environmental condition. The second transducer 103 may determine a difference between the first environmental condition and the second environmental condition. Further, the second transducer 103 may measure the difference between the first environmental condition and the second environmental condition to generate a difference signal. The second transducer 103 may output the difference signal using the second set of connectors 119.

Figure 2:
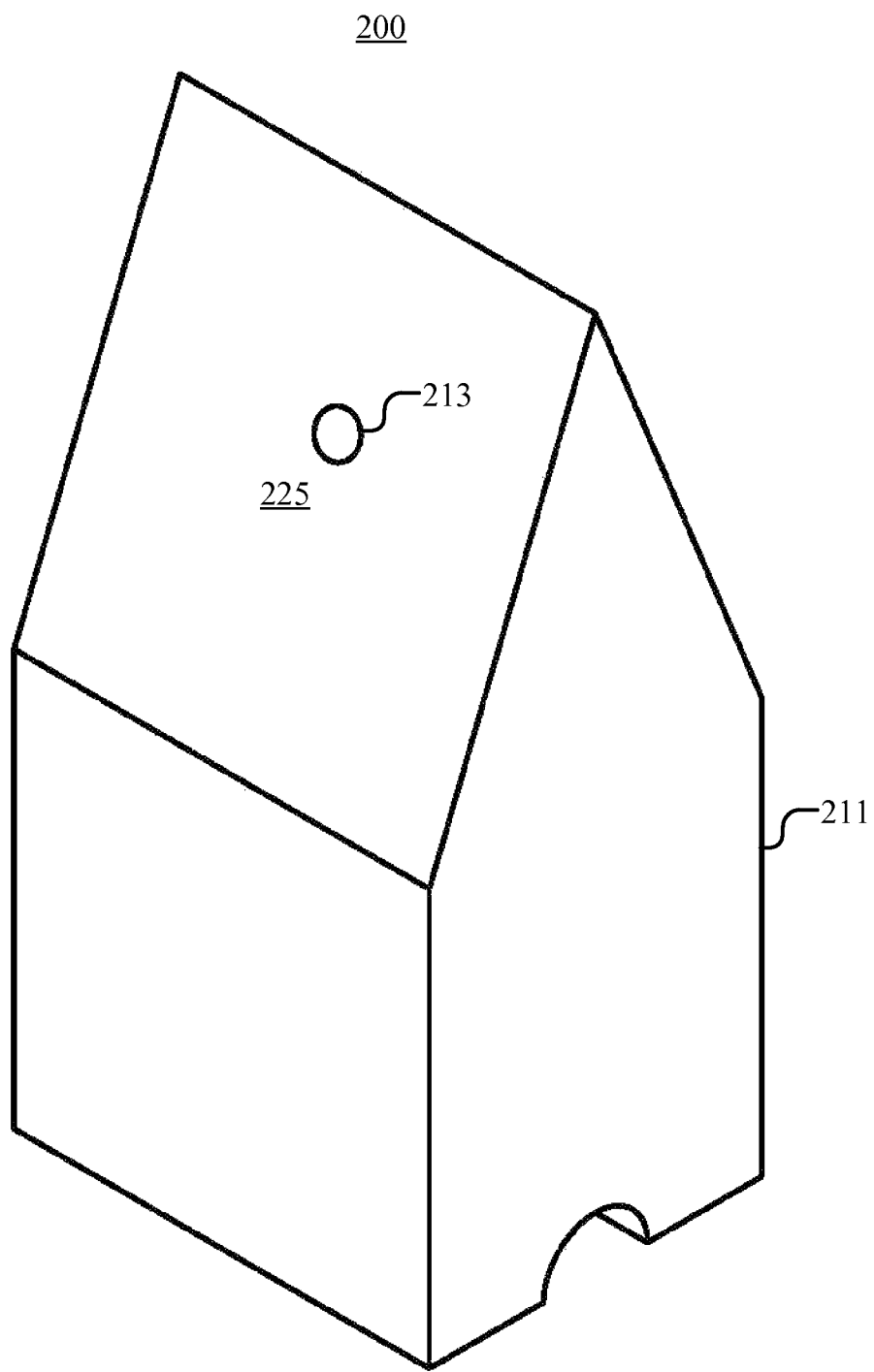
FIG. 2 illustrates a perspective view of one embodiment of a probe in accordance with various aspects described herein.

FIG. 2 illustrates a longitudinal perspective view of one embodiment of a probe 200 in accordance with various aspects described herein. In FIG. 2, the probe 200 may be configured to include a housing 211, a first aperture 213, a second aperture (not shown), a first oblique face 225 and a second oblique face (not shown). The housing 211 may be disposed around and may define the first aperture 213. The first aperture 213 may be disposed on a first oblique face 225 of a front portion of the housing 211. Similarly, the second aperture may be positioned on a second oblique face of the front portion of the housing 211. Each of the first aperture 213 and the second aperture may be positioned on opposite sides of the first oblique face 225 and the second oblique face of the front portion of the housing 211, respectively. In one example, each of the first aperture 213 and the second aperture may be symmetrically positioned on opposite sides of the first oblique face 225 and the second oblique face of the front portion of the housing 211, respectively. Furthermore, the front portion of the housing 211 may have a shape of a wedge defined by the first oblique face 225 and the second oblique face. The probe 200 may allow for measurements of two angles defined by the first oblique face and the second oblique face 225 of the front portion of the housing 211. Further, these measurements may include stagnation pressure, static pressure, Mach number, and the like. In one example, the probe 200 may allow for high accuracy, high frequency measurements of two orthogonal angles associated with the first oblique face 225 and the second oblique face.

In another embodiment, a first aperture may be positioned on a first oblique face of a front portion of a housing so that a first flow associated with a first environmental condition may be received at the first aperture. Further, a second aperture may be positioned on a second oblique face of the front portion of the housing so that a second flow associated with a second environmental condition may be received at the second aperture.

In another embodiment, a first flow of a first environmental condition at a first oblique face of a front portion of a housing may be about equivalent to a second flow of a second environmental condition at a second oblique face of the front portion of the housing.

In another embodiment, a first flow of a first environmental condition at a first oblique face may be different from a second flow of a second environmental condition at a second oblique face.

In another embodiment, each of a first aperture and a second aperture may be positioned about equidistant from a front end of a housing on a first oblique face and a second oblique face of a front portion of the housing, respectively.

In another embodiment, each of a first aperture and a second aperture may be positioned about equidistant along a longitudinal axis of a probe.

In another embodiment, a differential sensor may determine a difference between an environmental condition having a static component and a dynamic component and a filtered environmental condition having the static component to obtain a difference signal. Further, an absolute sensor may measure the environmental condition to obtain an absolute signal. A third tube may be used to filter the environmental condition to obtain the filtered environmental condition having the static component.

In another embodiment, a first transducer and a second transducer may be positioned about equidistance along a longitudinal axis of a probe. By doing so may result in the first transducer structure and the second transducer structure operating in about equivalent conditions such as pressure.

Figure 3:
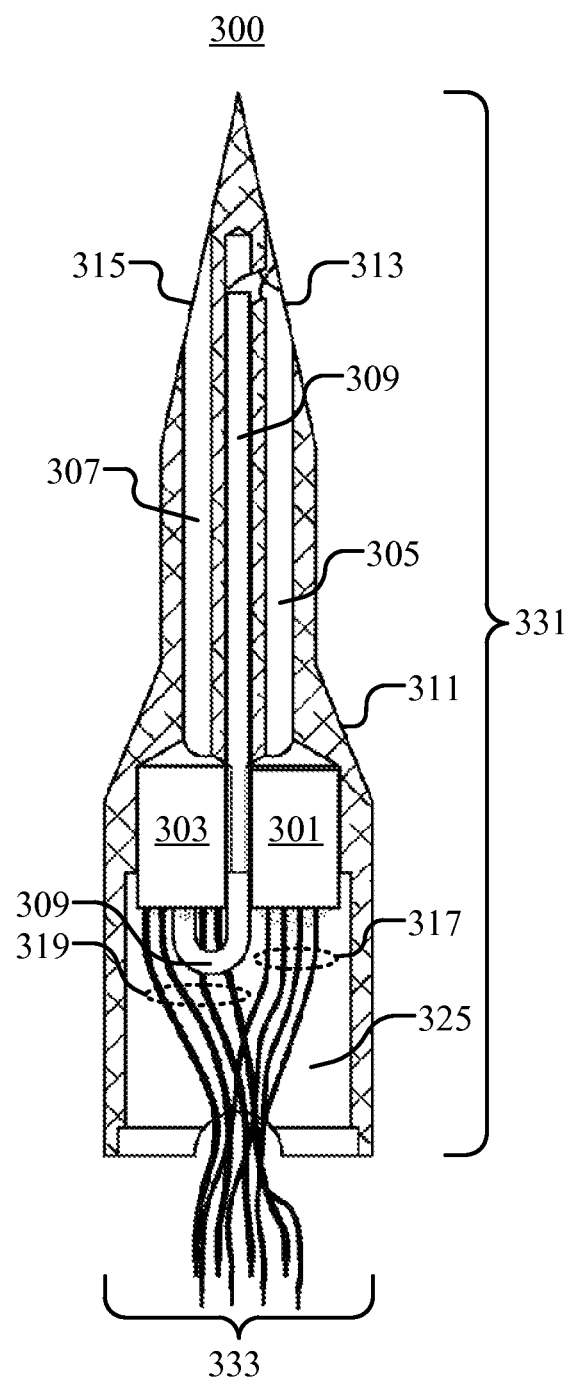
FIG. 3 illustrates a cross-sectional view of another embodiment of a probe in accordance with various aspects as described herein.

FIG. 3 illustrates a cross-sectional view of another embodiment of a probe 300 in accordance with various aspects as described herein. In FIG. 3, the probe 300 may be configured to include a first transducer 301, a second transducer 303, a first tube 305, a second tube 307, a third tube 309, a housing 311, a first aperture 313 in the housing 311, a second aperture 315 in the housing 311, a first set of connectors 317, a second set of connectors 319, and a cavity 325. Dimensions of the probe 300 may include a height 331 and a width 333. The probe 300 may be configured to utilize one or more absolute transducers, one or more differential transducers or any combination thereof, which may be strategically disposed in the housing 311 such as near an environmental condition such as a pressure media received at the first aperture 313 and the second aperture 315. The first transducer may be an absolute transducer or a differential transducer. In one example, the first transducer is an absolute transducer, which may be fabricated to include an internal environmental condition reference such as an internal hermetically-sealed vacuum reference pressure. The second transducer may be an absolute transducer or a differential transducer. In one example, the second transducer may be a differential transducer, which may be fabricated to include a reference tube or reference aperture. An integrated packaging of the first transducer 301 and the second transducer 303 in the housing 311 may provide a location proximate to the environmental conditions to be measured. Furthermore, each of the first transducer and the second transducer may include SOI piezoresistive elements. A shape of a front portion of the probe 300 may be angled, conical, wedge-shaped, pointed, pyramidal, spherical, tapered or the like.

In FIG. 3, a first end of the first tube 305 may be coupled to the first aperture 313 of the housing 311, which may be used to receive a first condition such as pressure. Further, the first transducer structure 301 may be coupled to a second end of the first tube 305. The housing 311 may be disposed around and define the first tube 305 and the first aperture 311. The second transducer 303 may be coupled to the second tube 307 and the third tube 309. A first end of the second tube 307 may be coupled to the second aperture 315. A first end of the third tube 309 may be coupled to the first aperture 311 or to another aperture in the housing 311. A second end of the second tube 307 may be coupled to a first or main side of the second transducer 303. A second end of the third tube 309, which may also be referred to as a reference tube, may be coupled to a second or reference side of the second transducer 303. The housing 311 may be disposed around and define the second tube 307, the third tube 309 or the second aperture 313.

In this embodiment, the first tube 305 and the third tube 309 may share the first aperture 313 of the housing 311, which may allow for contemporaneous measurements of the first environmental condition received at the first aperture 313 of the housing 311 by the first transducer 301 and the second transducer 303. The first set of connectors 317 may be configured to couple the first transducer 301 to a first electronic circuit. Further, the first set of connectors 317 may allow the first transducer 301 to communicate with the first electronic circuit. In one example, the first transducer 301 may provide a first environmental condition signal associated with a measured first environmental condition to the first electronic circuit using the first set of connectors 317. In another example, the first electronic circuit may configure the first transducer 301 using the first set of connectors 317. Also, the first electronic circuit may provide power to the first transducer 301 using the first set of connectors 317. The first set of connectors 317 may be disposed in the cavity 325 defined by the housing 311.

Similarly, the second set of connectors 319 may be configured to couple the second transducer 303 to a second electronic circuit. Further, the second set of connectors 319 may allow the second transducer 303 to communicate with the second electronic circuit. In one example, the second transducer 303 may provide a second environmental condition signal associated with a measured second environmental condition to the second electronic circuit using the second set of connectors 319. In another example, the second electronic circuit may configure the second transducer 303 using the second set of connectors 319. Also, the second electronic circuit may provide power to the second transducer 303 using the second set of connectors 319. Also, the second set of connectors 319 may provide power to the second transducer 303. The second set of connectors 319 may be disposed in the cavity 325 defined by the housing 311. Each of the first electronic circuit and the second electronic circuit may be placed in the housing 311 or may be located outside the housing 311. Further, the first electronic circuit and the second electronic circuit may be the same electronic circuit. A person of ordinary skill in the art will recognize various techniques for designing circuits to interface with a transducer.

In FIG. 3, the width 333 of the probe 300 may also be reduced by extending the length of the front portion of the housing 311, which may increase a length of each of the first tube 305, the second tube 307 or the third tube 309. Further, a width of the front portion of the housing 311 may be associated with a width of each of the first tube 305, the second tube 307 and the third tube 309. In one example, the width 333 of the housing 311 may be about thirteen-hundredths of an inch (0.13 inches). In another example, the width 333 of the housing 311 may be less than about two-tenths of an inch (0.2 inches). In another example, the width 333 of the housing 311 may be in a range from about two-hundredths of an inch (0.02 inches) which may vary more or less depending on field installation. In another example, the width 333 of the housing 311 may be associated with a width of each of the first tube 305, the second tube 307 and the third tube 309. In addition, the height 331 of the housing 311 may be adjusted to conform to the width 333 of the housing 311 or various widths of the front portion of the housing 311. A trade-off may occur between the size of the probe 300 and the desired measurement frequency content.

In the current embodiment, the housing 311 may also be used to attach or secure the probe 300 to another structure, protect all or a portion of the probe 300, provide a means to handle or place the probe 300 or the like. In one example, the housing 311 may be used to form an O-ring seal, may be threaded, may include a series of O-rings or bolts, or the like so that the probe 300 may be attached to another structure. The housing 311 may be composed of a thermally conductive material such as a ceramic material, metal or the like.

In FIG. 3, in operation, the first transducer 301, which may be an absolute transducer, may receive, at the first transducer, from the first aperture 313 using the first tube 305, the first environmental condition. The first transducer 301 may measure the first environmental condition to generate a first environmental condition signal. The first transducer 301 may output the first environmental condition signal using the first set of connectors 317. The second transducer 303, which may be a differential transducer, may receive, at the first or main side of the second transducer, from the second aperture 315 using the second tube 307, the second environmental condition. Further, the second transducer 303 may receive, at the second or reference side of the second transducer, from the first aperture 313 using the third tube 309, the first environmental condition. The second transducer 303 may determine a difference between the first environmental condition and the second environmental condition. Further, the second transducer 303 may measure the difference between the first environmental condition and the second environmental condition to generate a difference signal. The second transducer 303 may output the difference signal using the second set of connectors 319.

Figure 4:
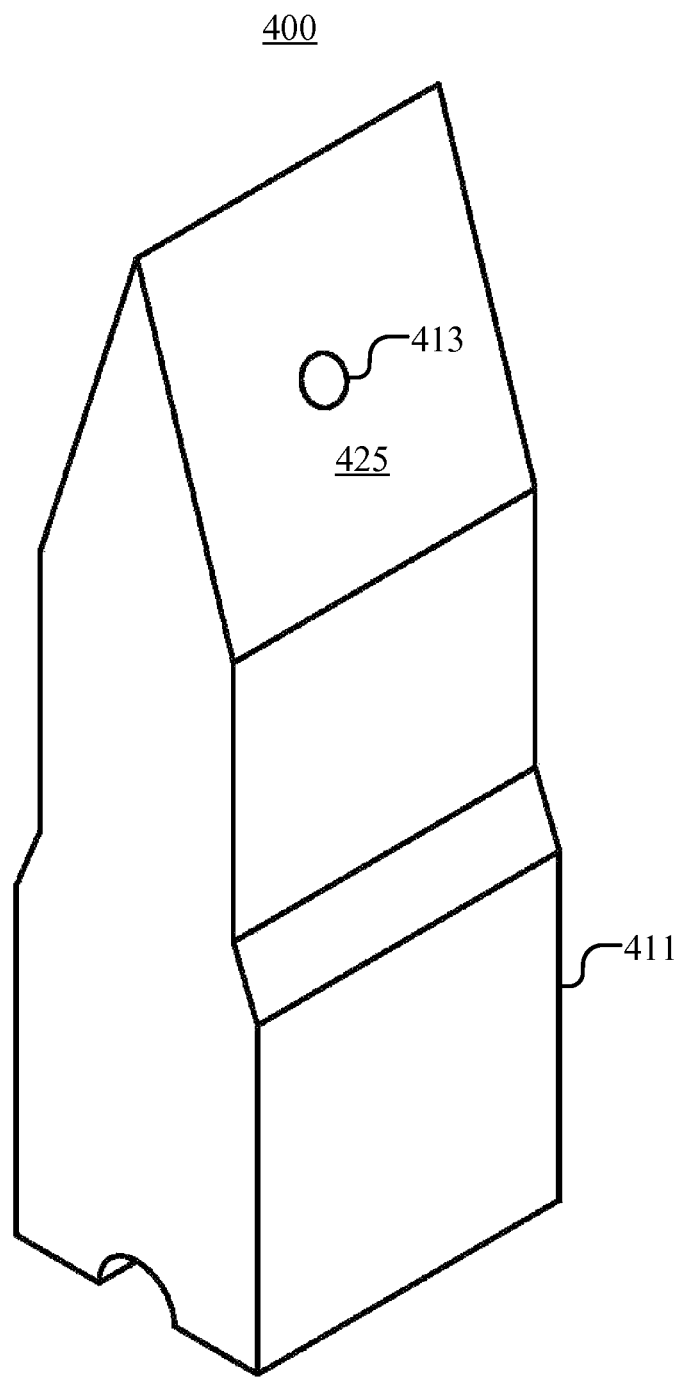
FIG. 4 illustrates a perspective view of another embodiment of a probe in accordance with various aspects described herein.

FIG. 4 illustrates a perspective view of another embodiment of a probe 400 in accordance with various aspects described herein. In FIG. 4, the probe 400 may be configured to include a housing 411, a first aperture 413, a second aperture (not shown), a first oblique face 425 and a second oblique face (not shown). The housing 411 may be disposed around and may define the first aperture 413. The first aperture 413 may be disposed on a first oblique face 425 of a front portion of the housing 411. Similarly, the second aperture may be positioned on a second oblique face of the front portion of the housing 411. Each of the first aperture 413 and the second aperture may be positioned on opposite sides of the first oblique face 425 and the second oblique face of the front portion of the housing 411, respectively. In one example, each of the first aperture 413 and the second aperture may be symmetrically positioned on opposite sides of the first oblique face 425 and the second oblique face of the front portion of the housing 411, respectively. Furthermore, the front portion of the housing 411 may have a shape of a wedge defined by the first oblique face 425 and the second oblique face. The probe 400 may allow for measurements of two angles defined by the first oblique face and the second oblique face of the front portion of the housing. Further, these measurements may include stagnation pressure, static pressure, Mach number, and the like. In addition, a height of the front portion of the housing 411 may be increased to allow for a width of at least a portion of the front portion of the housing 411 to be decreased.

Figure 5:
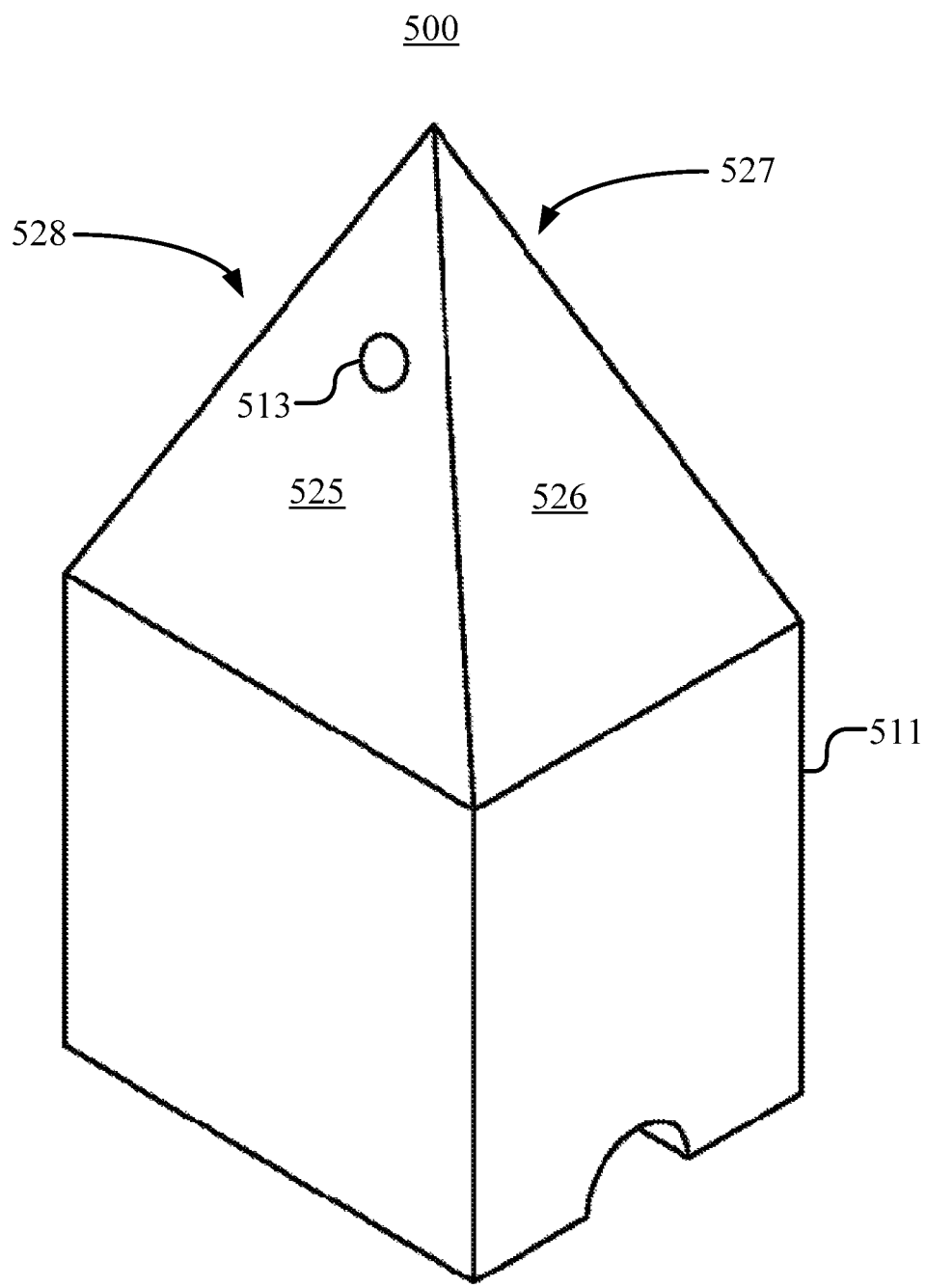
FIG. 5 illustrates a perspective view of another embodiment of a probe in accordance with various aspects described herein.

FIG. 5 illustrates a perspective view of another embodiment of a probe 500 in accordance with various aspects described herein. In FIG. 5, the probe 500 may be configured to include a housing 511, a first aperture 513, a second aperture (not shown), a first oblique face 525, a second oblique face 526, a third oblique face (not shown) 527 and a fourth oblique face (not shown) 528. A front portion of the housing 511 may be a shape of a pyramid with the first oblique face 525, the second oblique face 526, the third oblique face 527 and the fourth oblique face 528 forming the sides of the pyramid. The first oblique face 525 may be opposite to the third oblique face 527. Also, the second oblique face 526 may be opposite to the fourth oblique face 528. The first aperture 513 may be disposed on the first oblique face 525 of the front portion of the housing 511. The housing 511 may be disposed around and may define the first aperture 513. Similarly, the second aperture may be positioned on the third oblique face 527 of the front portion of the housing 511. The housing 511 may be disposed around and may define the second aperture. The first aperture 513 and the second aperture may be positioned on opposite sides of the front portion of the housing 511 on the first oblique face 525 and the third oblique face 527, respectively. In one example, each of the first aperture 513 and the second aperture may be symmetrically positioned on opposite sides of the front portion of the housing 511 on the first oblique face 525 and the third oblique face 527, respectively. The probe 500 may allow for measurements of two angles defined by the first oblique face 525 and the third oblique face 527 of the front portion of the housing, and by adding additional apertures on oblique faces 526 and 528. Further, the probe 500 may be positioned at different angles relative to a fluid flow, resulting in changing the fluid flow across each of the first oblique face 525 and the third oblique face 527. These measurements may include stagnation pressure, static pressure, Mach number, or the like. In one example, the probe 500 may allow for high accuracy, high frequency measurements of two orthogonal angles defined by the first oblique face 525 and the third oblique face 527 of the front portion of the housing. A shape of the front portion of the housing 511 may not impact a height or width of the front portion of the housing 511. However, the shape of the front portion of the housing 511 may impact measurement performance of the probe 500 such as for a particular flow, speed or the like. Thus, the shape of the front portion of the housing 511 may be selected to increase measurement performance of the probe 500.

Figure 6:
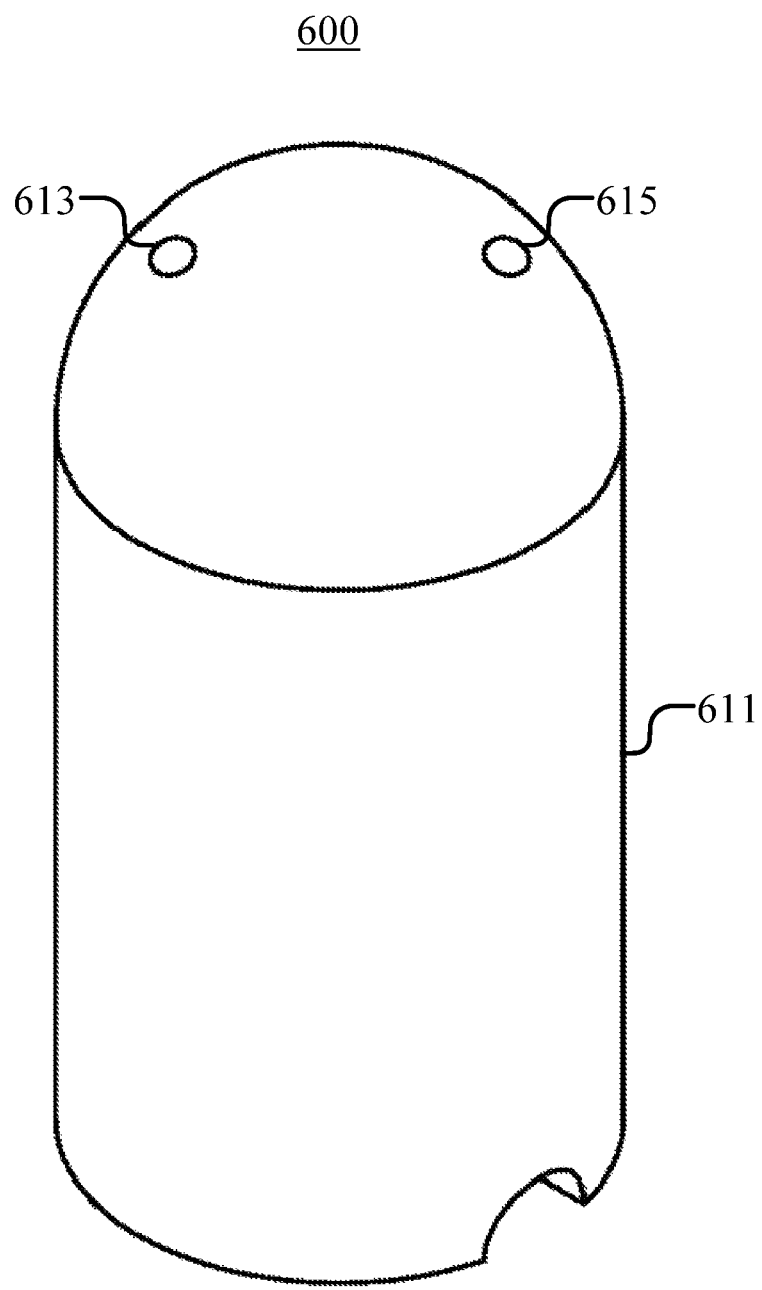
FIG. 6 illustrates a perspective view of another embodiment of a probe in accordance with various aspects described herein.

FIG. 6 illustrates a longitudinal perspective view of another embodiment of a probe 600 in accordance with various aspects described herein. In FIG. 6, the probe 600 may be configured to include a housing 611, a first aperture 613, a second aperture 615, and a plurality of front oblique sides. A front portion of the housing 611 may be a shape of a sphere with the plurality of front oblique sides combining to form the sphere. The first aperture 613 may be disposed on a first front oblique side of the plurality of front oblique sides. The housing 611 may be disposed around and may define the first aperture 613. Similarly, the second aperture 615 may be positioned on a second front oblique side of the plurality of front oblique sides. The housing 611 may be disposed around and may define the second aperture. The first aperture 613 and the second aperture 615 may be positioned on opposite sides of the front portion of the housing 611. In one example, the first aperture 613 and the second aperture may be symmetrically positioned on opposite sides of the front portion of the housing 611. The probe 600 may allow for measurements of two angles defined by the first front oblique side and the second front oblique side of the plurality of front oblique sides and by apertures in addition to 613 and 615. Further, these measurements may include stagnation pressure, static pressure, Mach number, or the like. In one example, the probe 600 may allow for high accuracy, high frequency measurements of two orthogonal angles defined by the first front oblique side and the second front oblique side of the plurality of front oblique sides. A shape of the front portion of the housing 611 may not impact a height or width of the front portion of the housing 611. However, the shape of the front portion of the housing 611 may impact measurement performance of the probe 600 such as for a particular flow, speed or the like. Thus, the shape of the front portion of the housing 611 may be selected to increase measurement performance of the probe 600.

Figure 7:
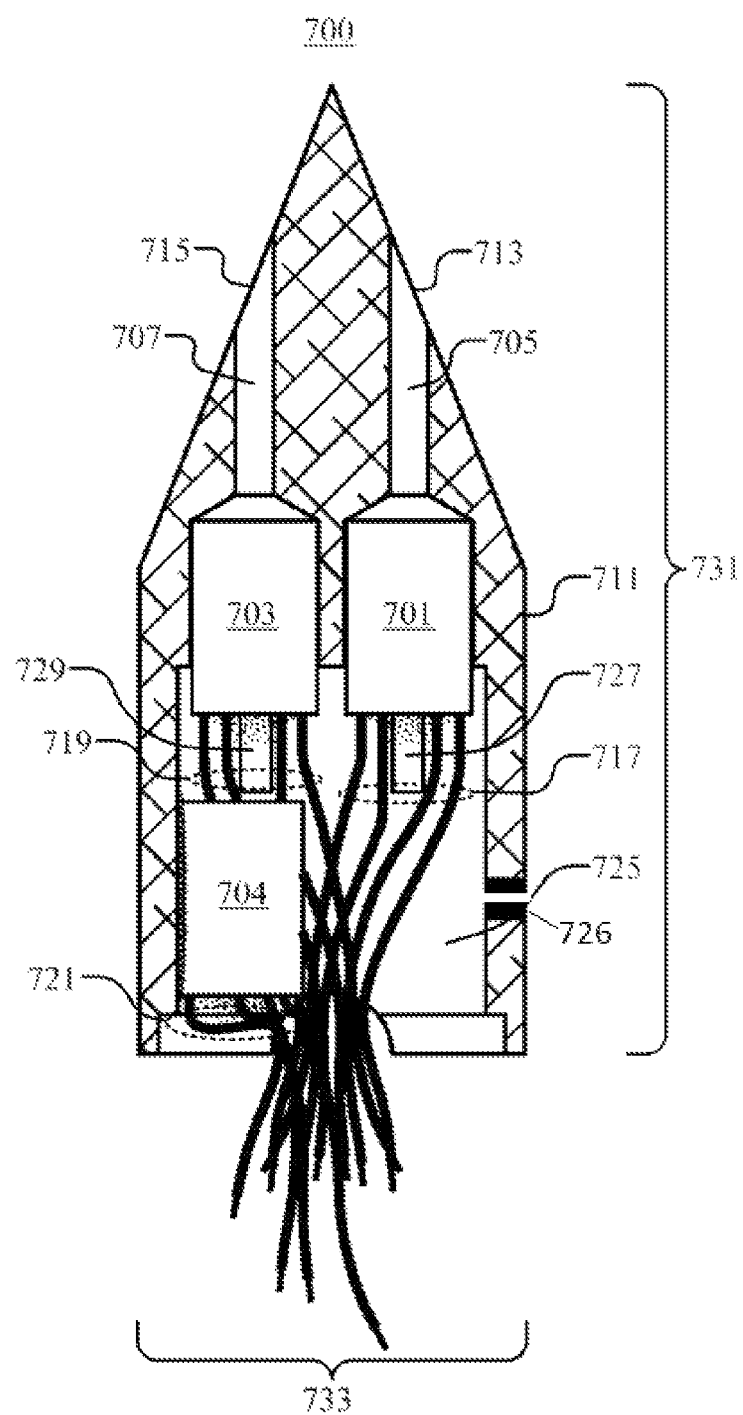
FIG. 7 illustrates a cross-sectional view of another embodiment of a probe in accordance with various aspects described herein.

FIG. 7 illustrates a cross-sectional view of another embodiment of a probe 700 in accordance with various aspects described herein. In FIG. 7, the probe 700 may be configured to include a first transducer 701, a second transducer 703, a third transducer 704, a first tube 705, a second tube 707, a housing 711, a first aperture 713 in the housing 711, a second aperture 715 in the housing 711, a first set of connectors 717, a second set of connectors 719, a third set of connectors 721, a cavity 725, a third tube 727 and a fourth tube 729. Dimensions of the probe 700 may include a height 731 and a width 733. The probe 700 may be configured to utilize one or more absolute transducers, one or more differential transducers or any combination thereof, which may be strategically disposed in the housing 711 near environmental conditions received at the first aperture 713 or the second aperture 715. The first transducer structure 701 may be configured to include a first transducer and a first header. The first transducer may be an absolute transducer or a differential transducer. In one example, the first transducer is a differential transducer. The second transducer may be an absolute transducer or a differential transducer. In one example, the second transducer may be a differential transducer, which may be fabricated to include a reference tube or reference aperture. The third transducer may be an absolute transducer or a differential transducer. In one example, the third transducer is an absolute transducer, which may be fabricated to include an internal reference environmental condition such as an internal hermetically-sealed vacuum pressure.

In FIG. 7, an integrated packaging of the first transducer 701 and the second transducer 703 in the housing 711 may provide a location of the first transducer and the second transducer proximate to the environmental conditions to be measured. Further, the third transducer 704 may be disposed in the cavity 725 of the housing 711. In addition, each of the first transducer, the second transducer and the third transducer may include SOI piezoresistive elements. A shape of a front portion of the probe 700 may be angled, conical, wedge-shaped, pointed, pyramidal, spherical, tapered or the like. The shape of the front portion of the probe 700 may not impact the dimensions of the probe 700, including the height 731 and the width 733 of the probe 700. Further, the shape of the probe 700 may be selected for a certain flow or speed application.

In this embodiment, a first end of the first tube 705 may be coupled to the first aperture 713 of the housing 711, which may be used to receive a first environmental condition such as pressure. Further, the first transducer 701 may be coupled to a second end of the first tube 705. In addition, a first end of the third tube 727, which may also be referred to as a reference tube, may be coupled to a second or reference side of the first transducer. A second end of the third tube 727 may be disposed in the cavity 725 of the housing 711 or may be coupled to another tube or another aperture in the housing 711. The housing 711 may be disposed around and may define the first tube 705, the first aperture 713 or the third tube 727.

Furthermore, the first set of connectors 717 may be configured to couple the first transducer 701 to a first electronic circuit. The first set of connectors 717 may allow the first transducer 701 to communicate with the first electronic circuit. In one example, the first transducer 701 may provide a first environmental condition signal associated with a measured first environmental condition to the first electronic circuit using the first set of connectors 717. In another example, the first electronic circuit may configure the first transducer 701 using the first set of connectors 717. Also, the first electronic circuit may provide power to the first transducer 701 using the first set of connectors 717. The first set of connectors 717 may be disposed in the cavity 725 defined by the housing 711.

In FIG. 7, the second transducer 703 may be coupled to the second tube 707 and the fourth tube 729. A first or main side of the second transducer 703 such as a differential pressure transducer may be positioned near the second aperture 715 of the housing 711. A second side of the second transducer 703, which may also be referred to as the reference side, may be exposed to the cavity 725 of the housing 711 using the fourth tube 729. A first end of the second tube 707 may be coupled to the second aperture 715. A second end of the second tube 707 may be coupled to a first side of the second transducer 703. A first end of the fourth tube 729, which may also be referred to as a reference tube, may be coupled to a second or reference side of the second transducer. A second end of the fourth tube 729 may be disposed in the cavity 725 of the housing 711 or may be coupled to another tube or another aperture in the housing 711. The housing 711 may be disposed around and may define the second tube 707, the second aperture 715 or the fourth tube 729.

Furthermore, the second set of connectors 719 may be configured to couple the second transducer 703 to a second electronic circuit. Further, the second set of connectors 719 may allow the second transducer 703 to communicate with the second electronic circuit. In one example, the second transducer 703 may provide a second environmental condition signal associated with a measured second environmental condition to the second electronic circuit using the second set of connectors 719. In another example, the second electronic circuit may configure the second transducer 703 using the second set of connectors 719. Also, the second electronic circuit may provide power to the second transducer 703 using the second set of connectors 719. The second set of connectors 719 may be disposed in the cavity 725 defined by the housing 711.

In this embodiment, the third transducer structure 704 may be disposed in the cavity 725 of the housing 711. Further, the third transducer, which may be an absolute pressure transducer, of the third transducer 704 may be exposed to the cavity 725 of the housing 711 using, for instance, a reference tube. The third set of connectors 721 may be configured to couple the third transducer 704 to a third electronic circuit. Further, the third set of connectors 721 may allow the third transducer 704 to communicate with the third electronic circuit. In one example, the third transducer 704 may provide a third environmental condition signal associated with a measured third environmental condition to the third electronic circuit using the third set of connectors 721. In another example, the third electronic circuit may configure the third transducer 704 using the third set of connectors 721. Also, the third electronic circuit may provide power to the third transducer 704 using the third set of connectors 721. The third set of connectors 721 may be disposed in the cavity 725 defined by the housing 711. Each of the first electronic circuit, the second electronic circuit or the third electronic circuit may be placed in the housing 711 or may be located outside the housing 711. Further, the first electronic circuit, the second electronic circuit or the third electronic circuit may be part of the same electronic circuit.

In this embodiment, there may also be a filter structure 726 such as described in U.S. patent application Ser. No. 13/28,037 between the outside of the probe and the internal cavity 725. This filter structure 726 may act to limit the frequency response of the internal cavity to give a true static reference pressure regardless of the dynamic pressure outside of the probe and regardless of the angle of attack of the probe. In a typical probe, the static pressure must be run through a long tube or be on an external stable structure.

In FIG. 7, the probe 700 may allow for the height 731 or the width 733 of the housing 711 to be miniaturized, since each of the first transducer and the second transducer may be a differential transducer. In one example the width 733 can be approximately 0.2, more or less depending on the application installation. Since a reference tube such as the third tube 109 of probe 100 in FIG. 1 is not used by the probe 700, a gap between the first transducer structure 701 and the second transducer structure 703 of the probe 700 may be less than a gap between the first transducer 101 and the second transducer 103 of the probe 100. Thus, the configuration of the probe 700 may allow for more miniaturization than the configuration of the probe 100, resulting in the width 733 of the probe 700 being less than the width 133 of the probe 100. Further, a differential transducer may have higher sensitivity or accuracy or may operate at higher frequencies than an absolute transducer. Thus, the probe 700 having two differential transducers may have higher sensitivity or accuracy or may operate at higher frequencies than the probe 100 having one differential transducer and one absolute transducer.

In operation, for the probe 700 having the two differential transducers, the first or main side of the first transducer 701 may receive the first environmental condition from the first aperture 713 while the second or reference side of the first transducer may receive a reference environmental condition such as from the cavity 725 of the housing 711. The first transducer may determine a first difference between the first environmental condition and the reference environmental condition to generate a first difference signal. Similarly, the first or main side of the second transducer 703 may receive the second environmental condition from the second aperture 715 while the second or reference side of the second transducer may receive the reference environmental condition such as from the cavity 725 of the housing 711. The second transducer may determine a second difference between the second environmental condition and the reference environmental condition to generate a second difference signal. The third transducer 704, which may be an absolute transducer, may receive the reference environmental condition such as from the cavity 725 of the housing 711 to generate a reference signal. The reference signal may be used in conjunction with the first difference signal and the second difference signal to determine a first absolute environmental condition at the first aperture 713 and a second absolute environmental condition at the second aperture 715, respectively, which may be used to determine a flow angle.

In another embodiment, a first transducer, a second transducer or the third transducer may be the same.

In another embodiment, a first transducer, a second transducer and a third transducer may share the same semiconductor substrate or packaging.

Figure 8:
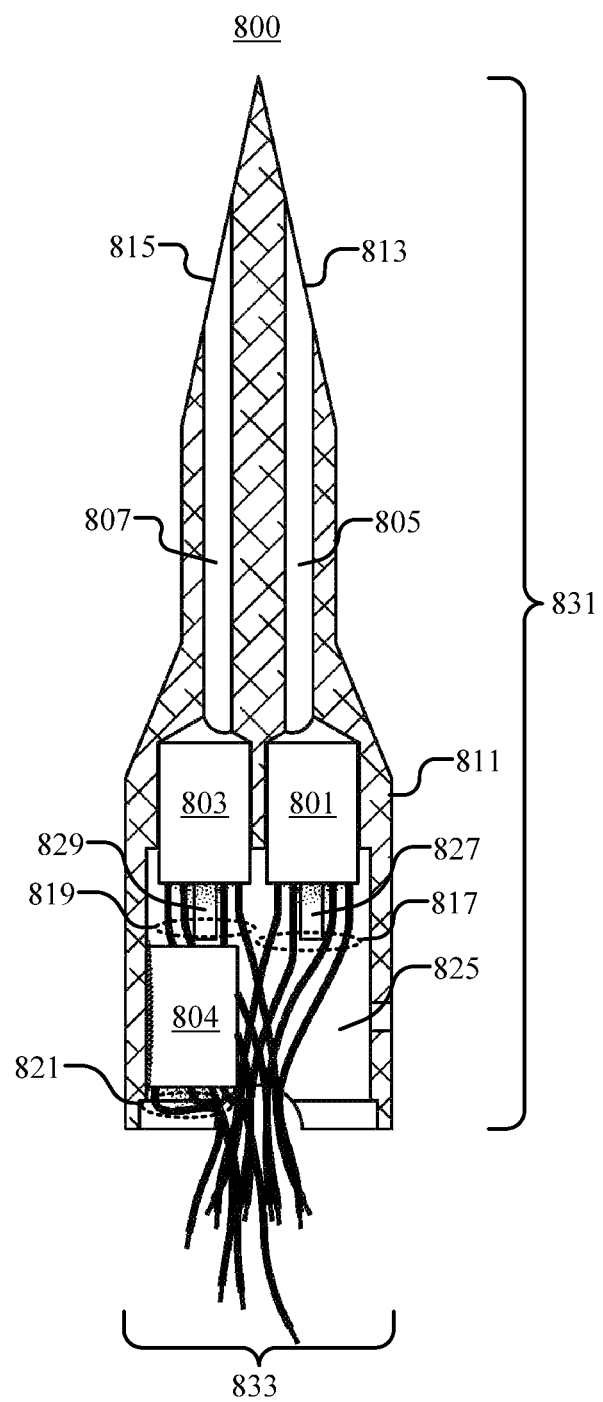
FIG. 8 illustrates a cross-sectional view of another embodiment of a probe in accordance with various aspects described herein.

FIG. 8 illustrates a cross-sectional view of another embodiment of a probe 800 in accordance with various aspects described herein. In FIG. 8, the probe 800 may be configured to include a first transducer 801, a second transducer 803, a third transducer 804, a first tube 805, a second tube 807, a housing 811, a first aperture 813 in the housing 811, a second aperture 815 in the housing 811, a first set of connectors 817, a second set of connectors 819, a third set of connectors 821, a cavity 825, a third tube 827 and a fourth tube 829. Dimensions of the probe 800 may include a height 831 and a width 833. The probe 800 may be configured to utilize one or more absolute transducers, one or more differential transducers or any combination thereof, which may be strategically disposed in the housing 811 near environmental conditions at the first aperture 813 or the second aperture 815.

In FIG. 8, the first transducer 801 may be configured to be an absolute transducer or a differential transducer. In one example, the first transducer is a differential transducer, which may be fabricated to include a reference tube or a reference aperture. The second transducer 803 may be configured to be an absolute transducer or a differential transducer. In one example, the second transducer may be a differential transducer, which may be fabricated to include the fourth tube 807 or a reference aperture. The third transducer structure 804 may be configured to be an absolute transducer or a differential transducer. In one example, the third transducer is an absolute transducer, which may be fabricated to include an internal reference environmental condition such as an internal hermetically-sealed vacuum reference pressure.

In this embodiment, an integrated packaging of the first transducer 801 and the second transducer 803 in the housing 811 may provide a location of the first transducer and the second transducer proximate to the environmental conditions to be measured. Further, the third transducer 804 may be disposed in the cavity 825 of the housing 811. In addition, each of the first transducer, the second transducer and the third transducer may include SOI piezoresistive elements. A shape of a front portion of the probe 800 may be angled, conical, wedge-shaped, pointed, pyramidal, spherical, tapered or the like. The shape of the front portion of the probe 800 may not impact the dimensions of the probe 800, including the height 831 and the width 833 of the probe 800. Further, the shape of the probe 800 may be selected to meet criteria for a certain flow or speed application.

In FIG. 8, the first transducer 801 may be coupled to the first tube 805 and the third tube 827. The first side of the first transducer 801 such as a differential pressure transducer may be positioned near the first aperture 813 of the housing 811. The second side of the first transducer 801, which may also be referred to as the reference side, may be coupled to the cavity 825 of the housing 811 using the third tube 827. A first end of the first tube 805 may be coupled to the first aperture 813 of the housing 811, which may be used to receive a first environmental condition such as pressure. Further, the first transducer 801 may be coupled to a second end of the first tube 805. In addition, a first end of the third tube 827, which may also be referred to as a reference tube, may be coupled to a second side of the first transducer 801. A second end of the third tube 827 may be disposed in the cavity 825 of the housing 811 or may be coupled to another tube or another aperture in the housing 811. The housing 811 may be disposed around and may define the first tube 805, the first aperture 813 or the third tube 827. The first transducer 801 may be used to couple the housing 811. In one example, the first transducer may be used to attach, secure, bond or the like to the housing 811.

Furthermore, the first set of connectors 817 may be configured to couple the first transducer 801 to a first electronic circuit. The first set of connectors 817 may allow the first transducer 801 to communicate with the first electronic circuit. In one example, the first transducer 801 may provide a first environmental condition signal associated with a measured first environmental condition to the first electronic circuit using the first set of connectors 817. In another example, the first electronic circuit may configure the first transducer 801 using the first set of connectors 817. Also, the first electronic circuit may provide power to the first transducer 801 using the first set of connectors 817. The first set of connectors 817 may be disposed in the cavity 825 defined by the housing 811.

In FIG. 8, the second transducer 803 may be coupled to the second tube 807 and the fourth tube 829. The first or main side of the second transducer 803 such as a differential pressure transducer may be positioned near the second aperture 815 of the housing 811. The second side of the second transducer 803, which may also be referred to as the reference side, may be exposed to the cavity 825 of the housing 811 using the fourth tube 829. A first end of the second tube 807 may be coupled to the second aperture 815. A second end of the second tube 807 may be coupled to a first side of the second transducer. A first end of the fourth tube 829, which may also be referred to as a reference tube, may be coupled to a second side 803. A second end of the fourth tube 829 may be disposed in the cavity 825 of the housing 811 or coupled to another tube or another aperture in the housing 811. The housing 811 may be disposed around and may define the second tube 807, the second aperture 815 or the fourth tube 829. The second transducer may determine a second difference between the second environmental condition and the reference environmental condition to generate a second difference signal.

Furthermore, the second set of connectors 819 may be configured to couple the second transducer 803 to a second electronic circuit. Further, the second set of connectors 819 may allow the second transducer 803 to communicate with the second electronic circuit. In one example, the second transducer 803 may provide a second environmental condition signal associated with a measured second environmental condition to the second electronic circuit using the second set of connectors 819. In another example, the second electronic circuit may configure the second transducer 803 using the second set of connectors 819. Also, the second set of connectors 819 may provide power to the second transducer 803. The second set of connectors 819 may be disposed in the cavity 825 defined by the housing 811.

In this embodiment, the third transducer 804 may be disposed in the cavity 825 of the housing 811. The third transducer 804 may be exposed to the cavity 825 of the housing 811 using, for instance, a reference tube. The third transducer 804, which may be an absolute transducer, may receive the reference environmental condition such as from the cavity 825 of the housing 811 to generate an absolute signal. The absolute signal may be used to determine absolute environmental conditions at the first aperture 813 and the second aperture 815, which may be used, for instance, to determine a flow angle.

Furthermore, the third set of connectors 821 may be configured to couple the third transducer 804 to a third electronic circuit. Further, the third set of connectors 821 may allow the third transducer 804 to communicate with the third electronic circuit. In one example, the third transducer 804 may provide a third environmental condition signal associated with a measured third environmental condition to the third electronic circuit using the third set of connectors 821. In another example, the third electronic circuit may configure the third transducer 804 using the third set of connectors 821. Also, the third electronic circuit may provide power to the third transducer 804 using the third set of connectors 821. The third set of connectors 821 may be disposed in the cavity 825 defined by the housing 811. Each of the first electronic circuit, the second electronic circuit or the third electronic circuit may be placed in the housing 811 or may be located outside the housing 811. Further, the first electronic circuit, the second electronic circuit or the third electronic circuit may be part of the same electronic circuit.

In this embodiment, a differential transducer may have higher sensitivity or accuracy or may operate at higher frequencies than an absolute transducer. Thus, the probe 800 having two differential transducers may have higher sensitivity or accuracy or may operate at higher frequencies than the probe 300 having one differential transducer and one absolute transducer. The width 833 of the probe 800 may be further reduced by extending the length of the front portion of the housing 811, which may increase a length of each of the first tube 805, the second tube 807 or the third tube 809. Further, a width of the front portion of the housing 811 may be associated with a width of each of the first tube 805, the second tube 807 and the third tube 809.

FIG. 9 is a flowchart of one embodiment of a probe by a process 900 in accordance with various aspects set forth herein. In FIG. 9, the probe by the process 900 may start, for instance, at 901, where it may include providing a housing having a front portion with a first oblique side and a second oblique side. Further, the housing may be configured to include a first aperture disposed on the first oblique side and a second aperture disposed on the second oblique side. At block 903, the probe by the process 900 may include inserting a first transducer into the housing proximate the first aperture. The first transducer may be configured to include a first transducer for measuring a first environmental condition received at the first aperture. At block 905, the probe by the process 900 may include inserting a second transducer into the housing proximate the second aperture. The second transducer may be configured to include a second transducer for measuring a second environmental condition received at the second aperture.

In FIG. 9, at block 907, the probe by the process 900 may include coupling the first transducer to the first aperture. The first transducer may include a first header. The first header may be configured to couple the first transducer to the housing. In one example, the first header may be configured to attach, secure, bond or the like the first transducer to the housing. Similarly, at block 909, the probe by the process 900 may include coupling the second transducer to the second aperture. The second transducer may include a second header. The second header may be configured to couple the second transducer to the housing. In one example, the second header may be configured to attach, secure, bond or the like the second transducer to the housing. In addition, at least one of the first transducer and the second transducer may be configured as a differential transducer. In one example, the first transducer may be an absolute transducer configured to measure the first environmental condition. Further, the second transducer may be a differential transducer configured to determine a difference between the first environmental condition and the second environmental condition. In another example, each of the first transducer and the second transducer may be a differential transducer. In addition, a width of the housing of the probe may be less than five-tenths of an inch (0.5 inches).

In another embodiment, a probe by a process may include providing a first tube having a first end and a second end. Further, the first end of the first tube may be coupled to a first aperture and the second end of the first tube may be coupled to a first transducer.

In another embodiment, a probe by a process may include providing a second tube having a first end and a second end. Further, the first end of the second tube may be coupled to a second aperture and the second end of the second tube may be coupled to a second transducer.

In another embodiment, a probe by a process may include providing a housing that is disposed around and defines a first tube, a second tube or a third tube.

In another embodiment, a probe by a process may include providing a third tube having a first end and a second end. Further, the probe by the process may include providing a second differential transducer having a first or main side and a second or reference side. The first side of the second transducer may be coupled to the second end of the second tube and the second side of the second transducer may be coupled to the second end of the third tube.

In another embodiment, a probe by a process may include providing a second transducer configured to measure a difference between a second environmental condition and a first environmental condition.

In another embodiment, a probe by a process may include providing each of a first transducer and a second transducer as a silicon-on-insulator (SOI) transducer.

In another embodiment, a probe by a process may include providing each of a first transducer and a second transducer as a piezoresistive transducer.

In another embodiment, a probe by a process may include providing a first transducer as an absolute transducer and a second transducer as a differential transducer.

In another embodiment, a probe by a process may include providing each of a first transducer and a second transducer as a differential transducer.

In another embodiment, a probe by a process may include providing a first oblique side of a front portion of a housing as about opposite to a second oblique side of a front portion of a housing.

In another embodiment, a probe by a process may include providing a first aperture on a first oblique side of a front portion of a housing as symmetrically opposite to a second aperture on a second oblique side of the front portion of the housing.

In another embodiment, a probe by a process may include providing a housing having a first aperture on a first oblique side of a front portion of a transducer and a second aperture on a second oblique side of the front portion of the transducer. Further, a first distance from a front end of the front portion of the housing to the first aperture is about equidistant to a second distance from the front end of the front portion of the housing to the second aperture.

In another embodiment, a probe by a process may include providing a housing having a first oblique side and a second oblique side. Further, a first angle of the first oblique side of the front portion of the housing may be about orthogonal to a second angle of the second oblique side of the front portion of the housing.

In another embodiment, a probe by a process may include providing a front portion of a housing having a shape of a sphere, a pyramid, a wedge, a cone or the like.

In another embodiment, a probe by a process may include providing a housing having a width less than about two-tenths of an inch.

In another embodiment, a probe by a process may include providing a front portion of a housing having a width less than about two-tenths of an inch.

In another embodiment, a probe by a process may include providing a housing having a height of less than about five-tenths of an inch.

In another embodiment, a probe by a process may include providing a front portion of a housing having a height of less than about five-tenths of an inch.

In another embodiment, a probe by a process may include providing a cavity. The housing may be disposed around and may define the cavity. Further, the probe by the process may include providing a first transducer a first or main side and a second or reference side. The first side of the first transducer may be coupled to a second end of a first tube. Further, the second side the first transducer may be coupled to the cavity. In addition, the probe by the process may include providing a second transducer a first side and a second side. The first side of the second transducer may be coupled to the second end of the second tube. Also, the second side second transducer may be coupled to the cavity. Furthermore, the probe by the process may include providing a third transducer having a third transducer for measuring a third environmental condition in the cavity of the housing. The third transducer structure may be disposed in the cavity of the housing proximate the first transducer structure and the second transducer structure.

In another embodiment, a probe by a process may include inserting a third transducer structure into a housing. The third transducer structure may be configured to include a third transducer for measuring a third environmental condition received from a cavity defined by the housing. The third transducer may be an absolute transducer. An absolute measurement of a third environmental condition by the third transducer may be used to determine an absolute measurement of a first environmental condition measured by a first transducer and an absolute measurement of a second environmental condition measured by a second transducer.

Figure 10:
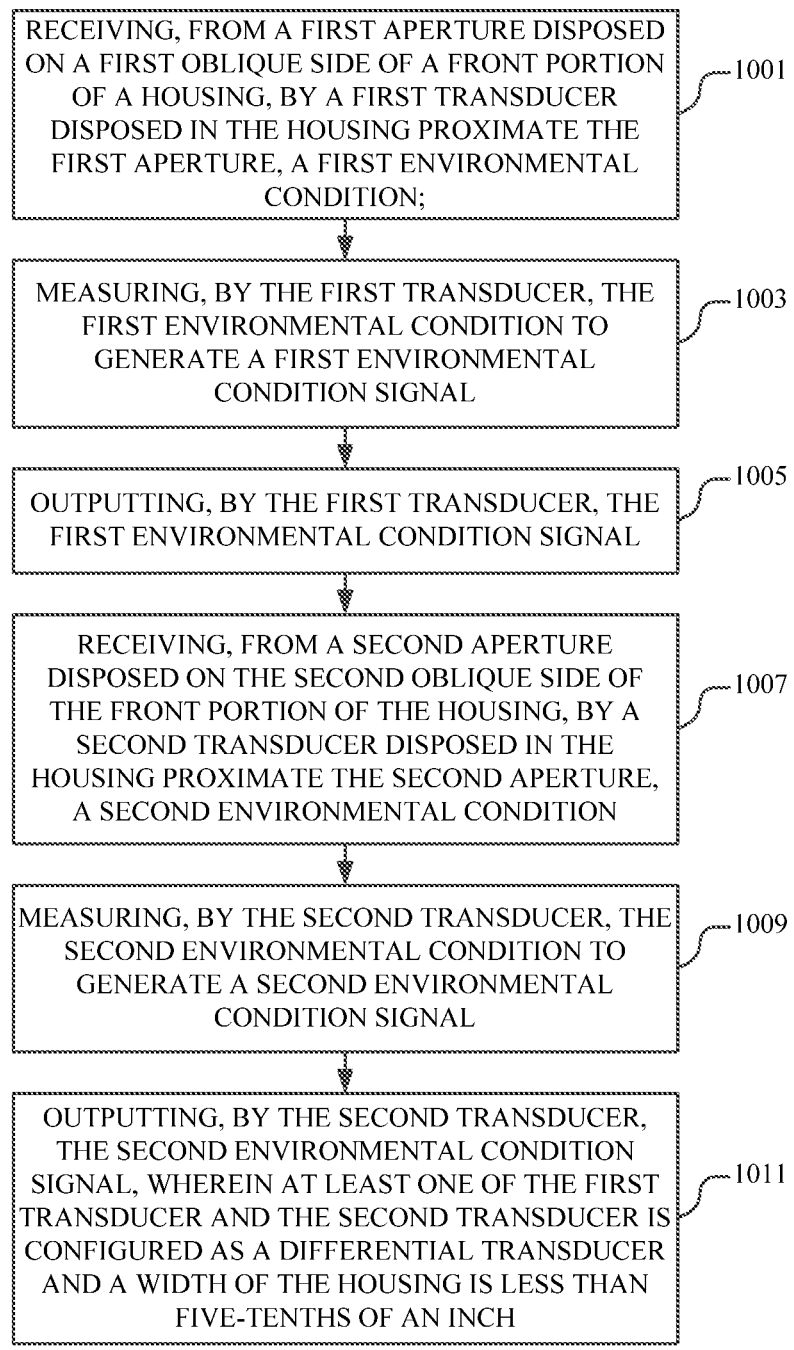
FIG. 10 is a flowchart of one embodiment of a method of performing a measurement of an environmental condition in accordance with various aspects set forth herein.

FIG. 10 is a flowchart of one embodiment of a method 1000 of performing a measurement of an environmental condition in accordance with various aspects set forth herein. In FIG. 10, the method 1000 may start, for instance, at block 1001, where it may include receiving, from a first aperture disposed on a first oblique side of a front portion of a housing, by a first transducer disposed in the housing proximate the first aperture, a first environmental condition. At block 1003, the method 1000 may include measuring, by the first transducer, the first environmental condition to generate a first environmental condition signal. Also, at block 1005, the method 1000 may include outputting, by the first transducer, the first environmental condition signal.

In FIG. 10, at block 1007, the method 1000 may include receiving, from a second aperture disposed on the second oblique side of the front portion of the housing, by a second transducer disposed in the housing proximate the second aperture, a second environmental condition. At block 1009, the method 1000 may include measuring, by the second transducer, the second environmental condition to generate a second environmental condition signal. At block 1011, the method 1000 may include outputting, by the second transducer, the second environmental condition signal. In addition, at least one of the first transducer and the second transducer may be configured as a differential transducer. In one example, the first transducer may be an absolute transducer configured to measure the first environmental condition. Further, the second transducer may be a differential transducer configured to determine a difference between the first environmental condition and the second environmental condition. In another example, each of the first transducer and the second transducer may be a differential transducer.

In addition, a width of the housing of the probe may be less than five-tenths of an inch (0.5 inches).

In another embodiment, a method may include receiving, at a first tube having a first end and a second end, from a first aperture, a first environmental condition. The first end of the first tube may be coupled to the first aperture. Also, the second end of the first tube may be coupled to a first transducer.

In another embodiment, a method may include receiving, at a second tube having a first end and a second end, from a second aperture, a second environmental condition. The first end of the second tube may be coupled to the second aperture. Also, the second end of the second tube may be coupled to the second transducer.

In another embodiment, a housing may be disposed around and may define a first tube.

In another embodiment, a housing may be disposed around and may define a second tube.

In another embodiment, a method may include receiving, at a third tube having a first end and a second end, from a first aperture, a third environmental condition.

In another embodiment, a method may include receiving, at a first or main side a second transducer, from a second end of a second tube, a second environmental condition. The first side of the second transducer may be coupled to the second end of the second tube. Further, the method may include receiving, at a second or reference side of the second transducer, from a second end of a third tube, a third environmental condition. The second side the second transducer may be coupled to the second end of the third tube.

In another embodiment, a method may include receiving, at a first or main side of a first transducer, from a first aperture of a housing, a first environmental condition. Further, the method may include receiving, at a second or reference side of the first transducer, from a cavity defined by the housing, a third environmental condition. The method may include measuring a first difference between the first environmental condition and the third environmental condition to generate a first difference signal.

In another embodiment, a method may include receiving, at a first or main side of a second transducer, from a second aperture of a housing, a second environmental condition. Further, the method may include receiving, at a second or reference side of the second transducer, from a cavity defined by the housing, a third environmental condition. The method may include measuring a second difference between the second environmental condition and the third environmental condition to generate a second difference signal.

Figure 11:
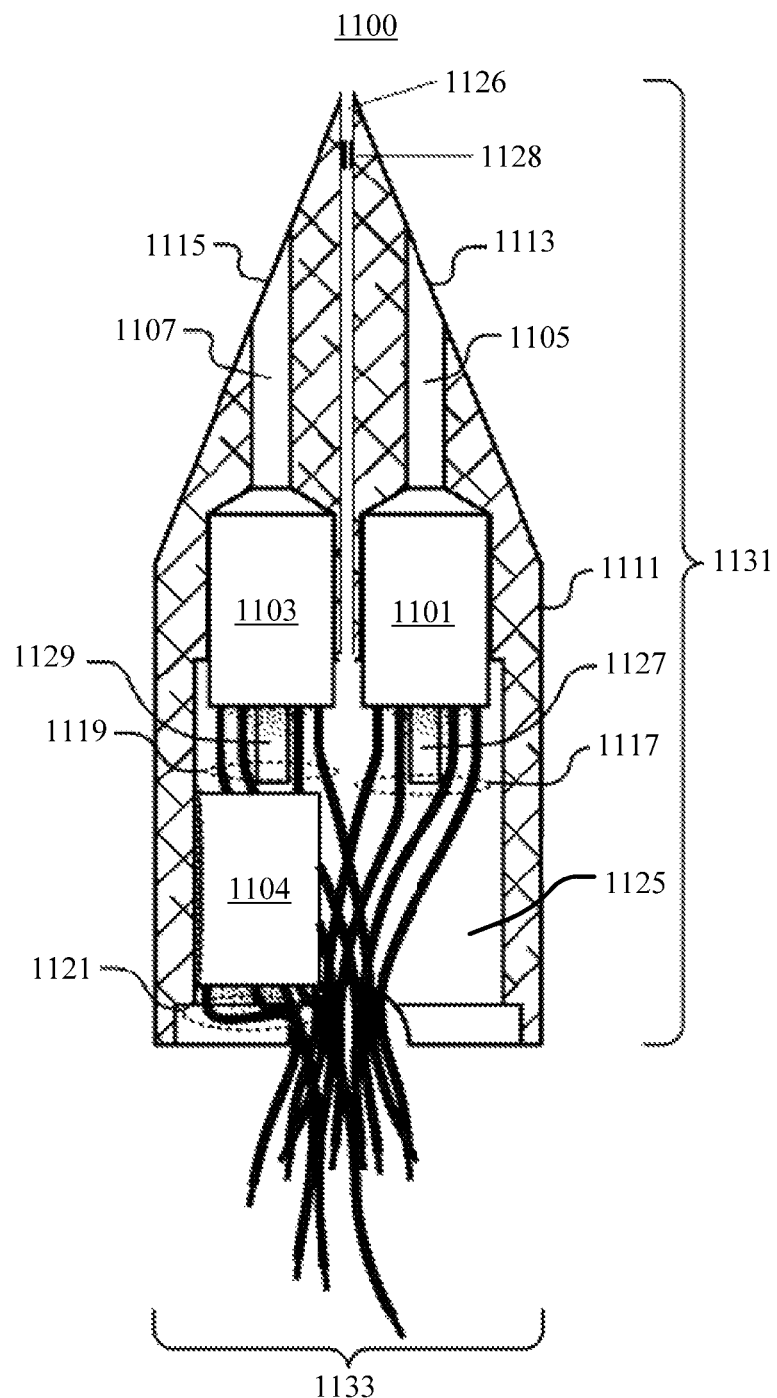
FIG. 11 illustrates a cross-sectional view of another embodiment of a probe in accordance with various aspects described herein.

FIG. 11 illustrates a cross-sectional view of another embodiment of a probe 1100 in accordance with various aspects described herein. In FIG. 11, the probe 1100 may be configured to include a first transducer 1101, a second transducer 1103, a third transducer 1104, a first tube 1105, a second tube 1107, a housing 1111, a first aperture 1113 in the housing 1111, a second aperture 1115 in the housing 1111, a first set of connectors 1117, a second set of connectors 1119, a third set of connectors 1121, a cavity 1125, a third tube 1127 and a fourth tube 1129. Dimensions of the probe 1100 may include a height 1131 and a width 1133. The probe 1100 is similar to the embodiment shown in FIG. 7 except instead of the cavity 1125 being referenced to the outside static pressure through a side wall it is referenced to the stagnation pressure through a front tube 1126. This front tube 1126 may also contain a micro-filter 1128 used to attenuate dynamic pressure signals present at the stagnation point. This embodiment has the advantage of allowing an absolute measurement of the stagnation pressure as well as referencing the two flow angle measurements to the stagnation pressure directly.

In another embodiment, a method may include receiving, at a third transducer, from a cavity defined by a housing, a third environmental condition.

In another embodiment, a third transducer structure may be configured to include a third transducer for measuring a third environmental condition in a cavity of a housing. The third transducer structure may be disposed in the housing.

In another embodiment, a third environmental condition may be a reference environmental condition.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned ultra-miniature, multi-hole flow angle probe, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A probe, comprising: a housing having a front portion with a first substantially flat oblique side and a second substantially flat oblique side; a first aperture and a second aperture, wherein the first aperture is disposed on the first oblique side and the second aperture is disposed on the second oblique side; a first transducer disposed in the housing and proximate the first aperture, wherein the first transducer is configured to measure a first environmental condition received at the first aperture; a second transducer disposed in the housing and proximate the second aperture, wherein the second transducer is configured to measure a second environmental condition received at the second aperture; wherein the width of the housing is less than about two tenths of an inch and the length is less than about three inches; and wherein the second transducer is configured to measure a difference between the second environmental condition and the first environmental condition.

2. The probe of claim 1, further comprising:
a first tube having a first end and a second end, wherein the first end of the first tube is coupled to the first aperture and the second end of the first tube is coupled to the first transducer; and
a second tube having a first end and a second end, wherein the first end of the second tube is coupled to the second aperture and the second end of the second tube is coupled to the second transducer.

3. The probe of claim 2, wherein the housing is disposed around and defines the first tube.

4. The probe of claim 2, wherein the housing is disposed around and defines the second tube.

5. The probe of claim 2, further comprising:
a third tube having a first end and a second end; and
wherein the second transducer is configured to have a first side and a second side, wherein the first side is coupled to the second end of the second tube and the second side is coupled to the second end of the third tube.

6. The probe of claim 5, wherein the housing is disposed around and defines the third tube.

7. The probe of claim 1, wherein each of the first transducer and the second transducer is a silicon-on-insulator (SOI) transducer.

8. The probe of claim 1, wherein each of the first transducer and the second transducer is a piezoresistive transducer.

9. The probe of claim 1, wherein the first transducer is an absolute transducer and the second transducer is a differential transducer.

10. The probe of claim 1, wherein each of the first transducer and the second transducer is a differential transducer.

11. The probe of claim 1, wherein the first oblique side of the front portion of the housing is about opposite to the second oblique side of the front portion of the housing.

12. The probe of claim 1, wherein the first aperture on the first oblique side of the front portion of the housing is symmetrically opposite to the second aperture on the second oblique side of the front portion of the housing.

13. The probe of claim 1, wherein a first distance from a front end of the front portion of the housing to the first aperture is about equidistant to a second distance from the front end of the front portion of the housing to the second aperture.

14. The probe of claim 1, wherein a first angle of the first oblique side of the front portion of the housing is about orthogonal to a second angle of the second oblique side of the front portion of the housing.

15. The probe of claim 1, wherein a shape of the front portion of the housing is spherical.

16. The probe of claim 1, wherein a shape of the front portion of the housing is pyramidal.

17. The probe of claim 1, wherein a shape of the front portion of the housing is wedge shaped.

18. The probe of claim 1, wherein a shape of the front portion of the housing is tapered.

19. The probe of claim 1, wherein a height of the housing is less than about one inch.

20. The probe of claim 1, wherein the first transducer is connected to the first aperture.

21. The probe of claim 1, wherein the second transducer is connected to the second aperture.

* * * * *